Nov. 29, 1966 A. WINKLER 3,288,388

FILM CARTRIDGE

Filed April 23, 1964 2 Sheets-Sheet 1

INVENTOR.
ALFRED WINKLER
BY

Nov. 29, 1966 A. WINKLER 3,288,388
FILM CARTRIDGE
Filed April 23, 1964 2 Sheets-Sheet 2

INVENTOR.
ALFRED WINKLER
BY

United States Patent Office 3,288,388
Patented Nov. 29, 1966

3,288,388
FILM CARTRIDGE
Alfred Winkler, Munich, Germany, assignor to Agfa
Aktiengesellschaft, Leverkusen, Germany
Filed Apr. 23, 1964, Ser. No. 362,062
Claims priority, application Germany, Oct. 10, 1963,
A 44,276; Dec. 12, 1963, A 44,779
12 Claims. (Cl. 242—71.1)

The present invention relates to film cartridges.

More particularly, the present invention relates to cartridges which are adapted to house photographic film.

The invention relates in particular to that type of film cartridge in which film is coiled without, however, being fixed to a film spool which is carried by the cartridge and adapted to be rotated by connection with a transmission at the exterior of the cartridge.

It is known to provide in the interior of the housing of certain film cartridges a spring which cooperates with film moving into the cartridge to form the film into a coil. This spring however, as the diameter of the coil increases, is necessarily deflected by and presses against the coil, and it has been found that the pressure of the spring on the film sometimes permanently deforms the film so that its convolutions are no longer substantially cylindrical. Such deformation of the film occurs particularly in the presence of heat and moisture. For example when such film is used in tropical countries the spring will unavoidably deform the film in this manner where a cartridge of this type is used.

It is accordingly a primary object of the present invention to provide a film cartridge which retains all of the advantages of film cartridges which do not have rotary spools but which at the same time will reliably avoid any deformation of the film, even in hot and humid climates. Experience has shown that when film is deformed in the above manner it is very difficult to maintain the film flat in the focal plane during exposure thereof, with the result that the quality of the photograph is greatly reduced and in fact sharp photographs cannot be achieved with such deformed film. These disadvantages are reliably avoided with the structure of the invention even in tropical, humid climates.

A further object of the present invention is to provide a film cartridge structure capable of efficiently coiling film into a coil of predetermined diameter without requiring a spool capable of being driven from the exterior of the cartridge or to which the film must be attached.

Yet another object of the present invention is to provide a film cartridge which is of a simple inexpensive construction and of a light weight, so that the advantages of conventional spoolless film cartridges are retained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
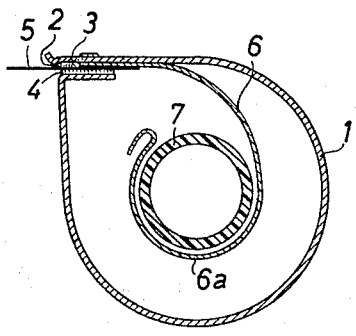
FIG. 1 is a transverse sectional illustration of one possible embodiment of a film cartridge according to the invention.

Referring now to FIG. 1, there is shown therein a film cartridge which includes a cartridge housing 1 which has the construction of a conventional housing of a spoolless film cartridge. The housing 1 is provided with an elongated mouth 2 in the form of a slit through which the film 5 can enter into and be removed from the housing 1, and the surfaces of the housing which define the mouth 2 thereof carry layers 3 and 4 of soft, fuzzy material well known in the art for providing light-tightness while permitting the film to move into and out of the housing. The film 5 is shown in FIG. 1 with the leading end thereof just having passed through the mouth 2 into the interior of the housing 1.

An elongated spring 6 is situated in the interior of the housing 1 and is fixed at one end thereto. For example, the fixed end of the spring 6 may be fixed to the housing together with the light-sealing material 3. The elongated spring 6 extends freely into the interior of the housing and when there is no film in the housing will have a curvature as illustrated in FIG. 1. Thus, it will be seen that the spring 6 has a concave surface directed toward the mouth of the housing 1 for receiving film introduced into the housing and forming the film into a coil. The spring 6 has an elongated curved portion 6a which extends along an arc of a circle when there is no film in the housing, and the leading end of the film will slide along the spring 6 to be curved thereby into a coil.

However, as the outer diameter of the film coil increases, the film coil tends to expand and flatten the spring 6 so that its portion 6a no longer extends along an arc of a circle, and as a result the spring 6 will press with a non-uniform pressure against the coil of film. The result is that, particularly under the influence of heat and moisture, the coil of film will be deformed by the spring since the film will yield and take on a configuration which is not substantially cylindrical. Such deformation of the film is extremely disadvantageous because the film is then difficult to maintain flat in the focal plane and will under certain circumstances result in unsharp photographs.

In order to avoid these disadvantages of spoolless film cartridges, there is provided, in accordance with the invention, a roller 7 in the interior of the cartridge, and the housing 1 of the cartridge carries the roller 7 in the interior of the housing for free movement therein. As is apparent from FIG. 1 the exterior surface of the roller 7 is curved in the same general direction as the spring 6 which, at its portion 6a, extends around a substantial portion of the roller 7, so that the spring 6 and the roller 7 define between themselves a slot into which the film moves to be coiled on the roller 7. This roller 7 is made of a material of low specific weight, preferably a plastic material, and in order to further reduce its weight the roller 7 is preferably in the form of a hollow cylinder of circular cross section. The exterior diameter of the roller 7 is approximately equal to the interior diameter of the coil of film which is formed in the cartridge. Thus, when the film 5 is introduced into the housing 1 it will be guided by the spring 6 so as to lay itself around the roller 7, and in this way the coil of film is formed on this roller which provides the coil with a hard core of circular cross section which, however, is movable with respect to the housing 1 and the spring 6. If, during increase in the diameter of the coil of film, the deflection of the spring 6 by the coil provides a pressure of the spring 6 against the coil which with a conventional spoolless film cartridge would result in deformation of the film, with the structure of the invention such deformation will not occur because the size and shape of the coil is determined by the roller 7 which prevents any deformation of the film convolutions wound around the roller 7. On the other hand, the structure of the invention still eliminates all of the disadvantages of cartridges provided with rotary film spools inasmuch as the film need not be fastened in any way to the roller 7 and the roller 7 itself rests loosely within the housing 1 and is free to take, to whatever extent that may be required, the movement of the film coil, the roller simply moving freely with the film coil during formation thereof.

Figure 6A:
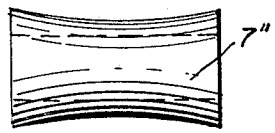
FIG. 6a is a front view illustration of another embodiment of a roller incorporated into the cartridge of the invention.
Figure 6B:
FIG. 6b is a front view of still a further embodiment of a roller incorporated into the cartridge of the invention.

Of course, the structure of the invention is not limited to the details shown in FIG. 1. The spring 6 may be in the form of a single wide leaf spring or in the form of several small leaf or wire springs distributed axially in the housing 1. Depending upon the particular construction of the spring the roller 7 can have a length substantially equal to that of the housing 1 or equal to only a fraction of the length of the housing 1. Moreover, in order to avoid a large area of contact between the film 5 and the roller 7 on the one hand and the spring portion 6a on the other hand, the roller 7 can have an exterior surface which is curved not only in the same general direction as the spring 6 but also which is either concave e.g. roller 7" as illustrated in FIG. 6a, or convex e.g. roller 7''' as illustrated in FIG. 6b in a direction perpendicular to the spring 6, which is to say axially of the roller 7. Furthermore, the end walls of the housing 1 can carry at the interior of the housing coaxial projections 8 which extend into the hollow interior of the roller 7 so as to limit the extent of free movement thereof, and for this purpose the roller 7 need only be hollow at its ends which are directed toward the ends of the housing 1, respectively. The diameter of the projections 8 is substantially smaller than the inner diameter of the roller 7.

Figure 3:
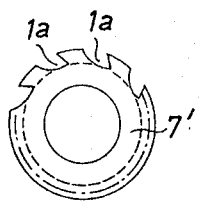
FIG. 3 shows in an end view another embodiment of a roller incorporated into the cartridge of the invention.

Furthermore, as is indicated in FIG. 3, the roller 7 can be provided at its exterior with a plurality of axially extending recesses 1a which are distributed about the roller and which are arranged tangentially with respect to the exterior surface thereof so that the leading end of the film 5 will be received in one of these recesses 1a.

Figure 2:
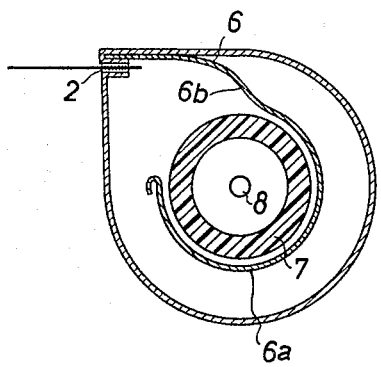
FIG. 2 is a transverse sectional illustration of another embodiment of a film cartridge according to the invention.

In addition, as is illustrated in FIG. 2, the spring 6 may be provided between its fixed end and its portion 6a which extends along an arc of a circle with a curved portion 6b approaching relatively close to the roller 7 so as to improve the guiding of the film to the roller 7.

Of course, the spring 6 instead of taking the form of a leaf spring can have the form of a wire spring.

Figure 4:
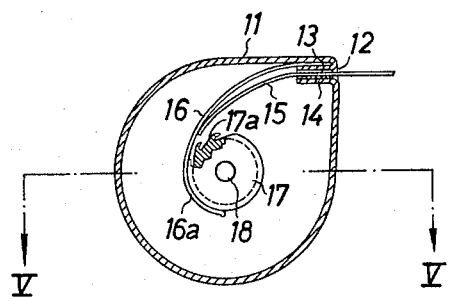
FIG. 4 illustrates a still further embodiment, in a transverse sectional view, of a film cartridge according to the invention.
Figure 5:
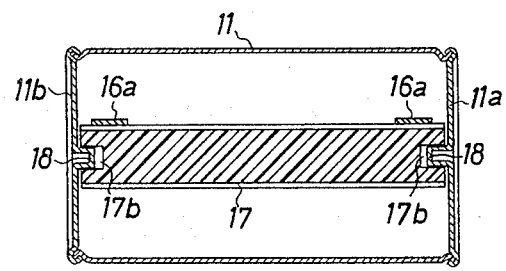
FIG. 5 is a longitudinal sectional view of the cartridge of FIG. 4 taken along line 5—5 of FIG. 4 and illustrating the structure of the cartridge along the entire length thereof.

In the embodiment of the invention which is illustrated in FIGS. 4 and 5, the cartridge housing 11 also is of a conventional construction and is provided with an elongated mouth 12 through which the film 15 can be introduced into or removed from the housing 11. The walls of the housing which define the mouth 12 carry the light-sealing layers 13 and 14, and an elongated spring 16 is located within the housing 11 and is fixed at one end to the housing 11 together with the light-sealing material 13. This spring 16 also has an elongated free portion 16a which extends along an arc of a circle, and if there were only the spring 16 in the interior of the housing 11 then the film would indeed be deformed, particularly under hot and humid conditions, by the spring 16 in the manner described above in connection with FIG. 1. In order to avoid this drawback the housing 11 has in its interior a roller 17 also of low specific weight and preferable made either of plastic, as pointed out above, or of a suitably curved or rolled band. It has been found that the film coil will have a particularly uniform round configuration if the roller 17 is freely rotatable in the housing 11 and also has a certain axial play, so that friction between the roller 17 and the housing 11 can be avoided, but the roller 17 should be prevented from having substantial radial movement.

This result is achieved by providing the end walls 11a and 11b of the housing with inwardly directed projections 18 which are coaxial and which are received within the bores 17b formed at the ends of the roller 17. Thus, with this embodiment the projections 18 are also received in hollow ends of the roller 17, but in contrast with the embodiment of FIG. 2, there is very little radial play for the roller 17. The extent of radial play is sufficient only to guarantee free rotary movement of the roller 17 as well as axial movement thereof within the limits afforded by the end walls 11a and 11b. As is apparent from FIG. 5 there are a pair of leaf springs having curved portions 16a in the interior of the housing 11 respectively adjacent the end walls thereof. Of course, instead of separate projections 18 it is possible to provide the roller 17 with an axial bore passing completely therethrough and to provide the housing 11 with a shaft fixed at its ends to the ends walls 11a and 11b and extending completely through the roller 17.

The roller 17 is formed at its exterior with a plurality of axial recesses 17a which extend along the entire length of the roller, which are distributed thereabout, and which are arranged tangentially with respect to the exterior surface of the roller 17, so that in this respect the structure is similar to that illustrated in FIG. 3. However, in the embodiment of FIGS. 4 and 5 the length of the springs 16 is such that the leading end of the film 15 is directed by the springs 16 into one of the recesses 17a so that the leading end of the film will then rotate the roller 17 during continued movement of the film 15 into the housing 11, and in this way a coil is very efficiently formed on the roller 17. However, the pressure of the springs 16 against the film, pressing the latter against the roller 17, is great enough so that the rotary impulse transmitted to the roller 17 by the film 15 is insufficient to cause the roller 17 to turn freely beyond the film 15, and thus the leading end thereof will remain in one of the recesses 17a.

It will be seen that with the construction of the invention all of the advantages of spoolless film cartridges are retained. Thus, fixing of the film to a film spool and rewinding of the film are unnecessary. Nevertheless a uniform coil of film is achieved and deformation of the film is reliably avoided. Of course, variations in the details described above are possible. For example, the projections 18 instead of being fixed to or formed integrally with the end walls 11a and 11b can be carried by leaf springs which are fixed to and extend substantially parallel to the end walls 11a and 11b.

It will be understood that each of the elements described above, or two or more together, may also find a useful application in other types of cartridges differing from the types described above.

While the invention has been illustrated and described as embodied in spoolless film cartridges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A film cartridge comprising, in combination, a cartridge housing having a mouth through which film is introduced into and withdrawn from said housing; a curved spring located in said housing and having an end fixed to said housing, said curved spring having a concave surface directed toward said mouth for receiving film which enters into said housing through said mouth thereof and forming the film into a coil; and a roller loosely supported in the interior of said housing rotatable about and movable transversely to its own axis, and said roller having an exterior surface curved in the same general direction as a portion of said spring and located adjacent the same so that the film is guided at least by said spring portion into a position adjacent said exterior surface of said roller.

2. A film cartridge comprising, in combination, a housing having a mouth through which film can be introduced into and withdrawn from said housing; a spring located in said housing and having an end fixed thereto, said spring having a concave surface directed toward said mouth so that said spring will guide film which enters into said housing through said mouth thereof into the form of a coil, said spring having an elongated rounded portion; and a roller loosely supported in the interior of said housing rotatable about and movable transversely to its own axis, and said roller having an exterior curved surface extending in the same general direction as said spring, and being surrounded in part by said rounded portion of said spring so that the film is guided at least by said spring portion into a position adjacent to and in engagement with said exterior surface of said roller.

3. A film cartridge comprising, in combination, a housing having a mouth through which film can be introduced into and withdrawn from said housing; an elongated spring located within said housing, fixed at one end to said housing, and having a concave surface directed toward said mouth for receiving film entering through said mouth into said housing and forming the film into a coil; and a roller loosely located in said housing for free rotary and radial movement therein and having an exterior curved surface which is curved in the same general direction as a portion of said spring and located adjacent the same so that the film is guided at least by said spring portion into a position adjacent said exterior surface of said roller, said roller having an exterior diameter which substantially corresponds to the interior diameter of a coil of film in said housing.

4. A film cartridge according to claim 1, said roller being an elongated hollow cylindrical roller.

5. A film cartridge comprising, in combination, a housing having a mouth through which film is adapted to be introduced and withdrawn from said housing; an elongated spring located in said housing, fixed at one end thereto, and having a concave surface directed toward said mouth for receiving film introduced into said housing through said mouth thereof and forming the film into a coil; and a roller of low specific weight loosely accommodated in the interior of said housing for free rotary and radial movement therein, said roller having an exterior surface curved in the same general direction as a portion of said spring and located adjacent the same so that the film is guided at least by said spring portion into a position adjacent said exterior surface of said roller.

6. A film cartridge comprising, in combination, a housing having a mouth through which film is adapted to be introduced into or removed from said housing; an elongated spring located in said housing, fixed at one end thereto, and having a concave surface directed toward said mouth to receive film therefrom and form the film into a coil; and a roller loosely accommodated in the interior of said housing for free rotary and radial movement therein and having an exterior surface which is curved both in the same general direction as a portion of said spring and in a direction substantially perpendicular thereto, said exterior surface of said roller being located adjacent said spring portion so that the film is guided at least by said spring portion into a position adjacent said exterior surface of said roller.

7. A cartridge as recited in claim 6 and wherein said roller has a concave curvature in a direction perpendicular to said spring.

8. A cartridge as recited in claim 6 and wherein said roller has a convex curvature in a direction perpendicular to said spring.

9. A film cartridge comprising, in combination, a housing having a mouth through which film is adapted to be introduced into and removed from said housing; an elongated spring located in said housing, fixed at one end thereto, and having a concave surface directed toward said mouth for receiving film introduced into said housing through said mouth thereof and forming the film into a coil; and a roller accommodated in the interior of said housing and supported therein solely by said spring for substantially free rotary and radial movement therein and having an exterior surface which is curved in the same general direction as said spring and which is formed with a plurality of elongated recesses distributed about said roller and arranged substantially tangentially with respect to said roller surface, so that a leading end of a film strip introduced into said housing through said mouth thereof will be received in one of said recesses.

10. A film cartridge comprising, in combination, a housing having a mouth through which film is adapted to be introduced into and removed from said housing; an elongated spring located in said housing, fixed at one end thereto, and having an elongated free arcuate portion provided with a concave surface which is directed toward said mouth; and a roller carried by said free arcuate portion of said spring in the interior of said housing for free movement therein and having an exterior surface curved in the same general direction as said spring and defining with said spring a slot into which the film moves, during entry into said housing through said mouth thereof, to be formed into a coil surrounding said roller.

11. A film cartridge comprising, in combination, housing means having a mouth through which film is adapted to be introduced into and removed from said housing; elongated spring means fixed at one end to said housing and having an elongated free curved portion provided with a concave surface directed toward said mouth for engaging film introduced into said housing through said mouth and forming the film into a coil; and a roller rotatably supported in the interior of said housing by said free curved portion of said spring, said roller having an exterior surface curved in the same general direction as said free curved portion of said spring and located adjacent the same so that the film is guided at least by said spring portion into a position adjacent said exterior surface of said roller.

12. A film cartridge comprising, in combination, a housing having a pair of opposed end walls and a mouth extending between said end walls and through which film is adapted to be introduced into and removed from said housing; an elongated spring located in said housing, fixed at one end thereto, and having a concave surface directed toward said mouth for receiving film introduced through said mouth into said housing and forming the film into a coil; a roller loosely accommodated in the interior of said housing for free rotary and radial movement therein and having an exterior surface curved in the same general direction as said spring, said roller having opposed hollow ends directed toward said end walls of said housing; and a pair of projections respectively carried by said end walls of said housing and extending with play into said hollow ends of said roller for limiting the amount of free radial movement thereof in said housing.

References Cited by the Examiner

UNITED STATES PATENTS

| | | | |
|---|---|---|---|
| 1,479,960 | 1/1924 | Flynn | 242—71.1 |
| 1,694,401 | 12/1928 | Slocum | 242—71.1 |
| 2,236,917 | 4/1941 | Pollock | 242—71.1 |
| 2,487,479 | 11/1949 | Roehrl | 242—71.1 |

FOREIGN PATENTS 514,789  12/1930  Germany.

STANLEY N. GILREATH, *Primary Examiner.*

N. L. MINTZ, *Assistant Examiner.*

MERVIN STEIN, *Examiner.*